(12) United States Patent
Lee et al.

(10) Patent No.: US 12,287,987 B2
(45) Date of Patent: Apr. 29, 2025

(54) DATA PROCESSING APPARATUS AND METHOD USING DIRECT MEMORY ACCESS

(71) Applicant: SAMSUNG ELECTRONICS CO., LTD., Suwon-si (KR)

(72) Inventors: Won-Jo Lee, Suwon-si (KR); Hyunsoo Kim, Bucheon-si (KR); Seungwon Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 17/869,531

(22) Filed: Jul. 20, 2022

(65) Prior Publication Data
US 2023/0026505 A1 Jan. 26, 2023

(30) Foreign Application Priority Data

Jul. 23, 2021 (KR) .......... 10-2021-0096786

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 15/7821; G06F 13/28; G06F 3/0658
USPC ....................................................... 711/154
See application file for complete search history.

(56) References Cited

U.S. PATENT DOCUMENTS

| | | | |
|---|---|---|---|
| 8,316,185 B2 | 11/2012 | Sih et al. | |
| 9,703,725 B2 | 7/2017 | Berke et al. | |
| 10,534,682 B2 | 1/2020 | Walker et al. | |
| 10,719,463 B1 | 7/2020 | Bshara et al. | |
| 2017/0308478 A1 | 10/2017 | Kiss et al. | |
| 2018/0197584 A1 | 7/2018 | Lee et al. | |
| 2018/0246817 A1 | 8/2018 | Feehrer et al. | |
| 2019/0265976 A1 | 8/2019 | Goryavskiy et al. | |
| 2019/0332556 A1 | 10/2019 | Nale et al. | |
| 2020/0151109 A1* | 5/2020 | Cho ............. | G06F 12/0238 |

(Continued)

FOREIGN PATENT DOCUMENTS

| | | | | |
|---|---|---|---|---|
| CN | 112748859 A | * | 5/2021 | ......... G06F 12/0246 |
| KR | 10-2020-0108773 A | | 9/2020 | |
| WO | WO-2022010016 A1 | * | 1/2022 | ........... G06F 3/0604 |

OTHER PUBLICATIONS

Kwon, et al. "A 20nm 6gb function-in-memory dram, based on hbm2 with a 1.2 tflops programmable computing unit using bank-level parallelism, for machine learning applications." 2021 *IEEE International Solid-State Circuits Conference (ISSCC).* vol. 64. IEEE, 2021. pp. 350-352.

*Primary Examiner* — Mardochee Chery
(74) *Attorney, Agent, or Firm* — NSIP Law

(57) ABSTRACT

A data processing apparatus and method are disclosed. The data processing apparatus may include a host core configured to generate a control message to control a direct memory access (DMA), the DMA configured to generate a memory request based on the control message, a memory controller configured to generate a memory command based on the memory request, and a processor configured to perform an operation in a memory based on the memory command.

19 Claims, 5 Drawing Sheets

(56) References Cited

U.S. PATENT DOCUMENTS

2020/0192841 A1    6/2020  Lee et al.
2020/0371938 A1  11/2020  Bhoria et al.
2021/0255956 A1*  8/2021  Kuyel .................... G06F 13/28

* cited by examiner

DATA PROCESSING APPARATUS AND METHOD USING DIRECT MEMORY ACCESS

CROSS-REFERENCE TO RELATED APPLICATIONS

This application claims the benefit under 35 USC § 119(a) of Korean Patent Application No. 10-2021-0096786, filed on Jul. 23, 2021, in the Korean Intellectual Property Office, the entire disclosure of which is incorporated herein by reference for all purposes.

BACKGROUND

1. Field

The following description relates to a data processing method and apparatus using direct memory access (DMA).

2. Description of Related Art

A conventional data processing method directly generates a memory command required for a processing in memory (PIM) operation in a host core and requests an operation result.

In a process of generating a memory transaction of data of static random access memory (SRAM) which serves as a cache, to a PIM device which has a dynamic random access memory (DRAM), the conventional data processing method commands processes of performing a role of a memory controller by the host core and receiving an operation result of the PIM back to the SRAM.

When processing data by the conventional method, a performance degradation may occur since a data bandwidth of the host core is continuously occupied while data is moving. In addition, a barrier (memory fence) overhead is inevitable to control the PIM, which is an in-order memory command device, in the host core operating out-of-order.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a data processing apparatus includes a host core configured to generate a control message to control a direct memory access (DMA), the DMA configured to generate a memory request based on the control message, a memory controller configured to generate a memory command based on the memory request, and a processor configured to perform an operation in a memory based on the memory command.

The host core may include a central processing unit (CPU), a graphics processing unit (GPU), a neural processing unit (NPU), a digital signal processor (DSP), an advanced reduced instruction set computer (RISC) machine (ARM), or a field programmable gate array (FPGA).

The DMA may be configured to generate the memory request via a processing in memory (PIM) host program.

The DMA may be configured to generate a read request or a write request via the PIM host program.

The DMA may be configured to generate the memory request in an in-order form via the PIM host program.

The memory controller may be configured to convert the memory request into the memory command including any one or any combination of an active command, a precharge command, a refresh command, a read command and a write command.

The memory may include a dynamic random access memory (DRAM).

The DRAM may include any one or any combination of a double data rate synchronous dynamic random access memory (DDR SDRAM), a low power DDR (LPDDR), and a high bandwidth memory (HBM).

The processor may be configured to perform the operation via a PIM device program.

In another general aspect, there is provided a data processing method includes generating a control message to control a direct memory access (DMA), generating a memory request based on the control message, generating a memory command based on the memory request, and performing an operation in a memory based on the memory command.

The generating of the control message may include generating the control message using a central processing unit (CPU), a graphics processing unit (GPU), a neural processing unit (NPU), a digital signal processor (DSP), an advanced reduced instruction set computer (RISC) machine (ARM), or a field programmable gate array (FPGA).

The generating of the memory request may include generating the memory request via a processing in memory (PIM) host program.

The generating of the memory request via the PIM host program may include generating a read request or a write request via the PIM host program.

The generating of the memory request via the PIM host program may include generating the memory request in an in-order form via the PIM host program.

The generating of the memory command may include converting the memory request into the memory command including an active command, a precharge command, a refresh command, a read command and a write command.

The memory may include a dynamic random access memory (DRAM).

The DRAM may include any one or any combination of a double data rate synchronous dynamic random access memory (DDR SDRAM), a low power DDR (LPDDR), and a high bandwidth memory (HBM).

The performing of the operation may include performing the operation via a PIM device program.

Other features and aspects will be apparent from the following detailed description, the drawings, and the claims.

Figure 1:
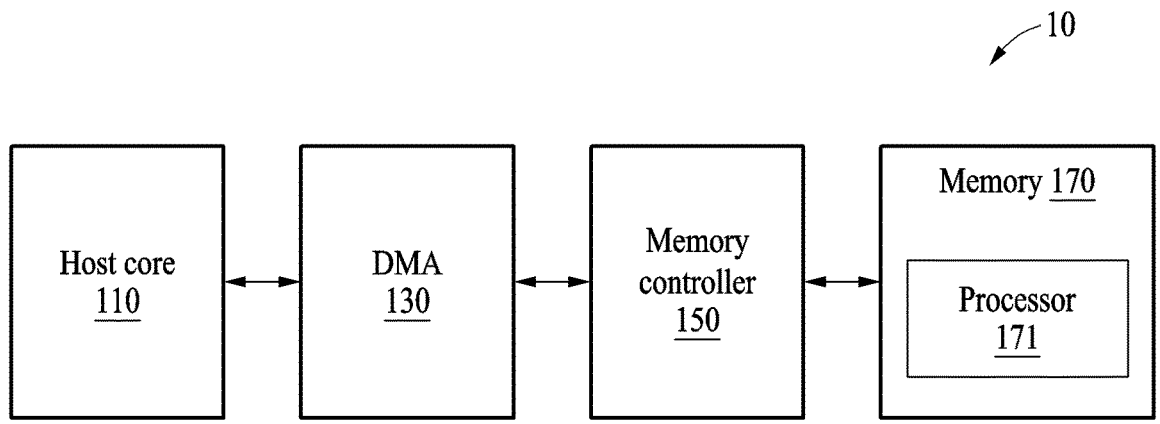
FIG. 1 illustrates an example of a data processing apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The use of the term "may" herein with respect to an example or embodiment (e.g., as to what an example or embodiment may include or implement) means that at least one example or embodiment exists where such a feature is included or implemented, while all examples are not limited thereto.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 illustrates an example of a data processing apparatus.

A data processing apparatus 10 may process data. The data may be information in the form of characters, numbers, sounds, or pictures that may be processed by a computer. The data processing apparatus 10 may process transactions of data between an operation device and a storage device, between operation devices and/or between storage devices.

In an example, the data processing apparatus 10 may include a host core 110, a direct memory access (DMA) 130, a memory controller 150, and a memory 170. The memory 170 may include a processor 171.

The host core 110 may generate a control message to control the DMA 130. The host core 110 may include at least one host processor. The host processor may process data stored in the memory 170. The host processor may execute a computer-readable code (for example, software) stored in the memory 170 and instructions triggered by the host processor.

The "processor" may be a data processing device implemented by hardware including a circuit having a physical structure to perform desired operations. For example, the desired operations may include code or instructions included in a program.

For example, the hardware-implemented data processing device may include a microprocessor, a central processing unit (CPU), a processor core, a multi-core processor, a multiprocessor, an application-specific integrated circuit (ASIC), and a field programmable gate array (FPGA).

The host core 110 may include a CPU, a graphics processing unit (GPU), a neural processing unit (NPU), a digital signal processor (DSP), an advanced reduced instruction set computer (RISC) machine (ARM), or a FPGA. According to an example the host core 110 may be implemented in a server or a mobile device.

The host core 110 may request the DMA to execute a host program.

The memory 170 may store data. The memory 170 may store data used in the host core 110 and the processor 171. The memory 170 may store operation results obtained by the host core 110 and the processor 171.

The memory 170 may store instructions (or programs) executable by the host core 110 and the processor 171. For example, the instructions may include instructions for executing an operation of the processor 171 and/or instructions for performing an operation of each component of the processor 171.

The memory 170 may be implemented as a volatile memory device or a non-volatile memory device.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device, or an insulator resistance change memory.

The DRAM may include a double data rate synchronous dynamic random access memory (DDR SDRAM), a low power DDR (LPDDR), and a high bandwidth memory (HBM).

The memory 170 may store an operation result of the host core 110. The memory 170 may include the DRAM. The memory 170 may store data used for an operation of the host core 110.

The DMA 130 may refer to a function of a computer system or a module thereof which allows a hardware subsystem to access the memory 170 independently from the host core 110. The DMA 130 may generate a memory request based on the control message.

The DMA 130 may generate the memory request via a processing in memory (PIM) host program. The memory request may include a read request or a write request. The DMA 130 may generate the read request or the write request via the PIM host program. The DMA 130 may generate the memory request in an in-order form via the PIM host program.

The DMA 130 may receive a request to execute the PIM host program from the host core 110 and may generate the memory request in an in-order form wherein the memory request is specified in the PIM host program based on an execution command of the host core 110.

The memory controller 150 may manage data input to and output from the memory 170. The memory controller 150 may generate a memory command based on the memory request. The memory controller 150 may convert the memory request into the memory command including an active command, a precharge command, a refresh command, a read command, and a write command.

The memory controller 150 may convert the memory request received from the DMA 130 into the memory command and transmit the memory command to the memory 170.

The processor 171 may process data stored in the memory 170. The processor 171 may execute a computer-readable code (for example, software) stored in the memory 170 and instructions triggered by the processor 171.

The "processor" may be a data processing device implemented by hardware including a circuit having a physical structure to perform desired operations. For example, the desired operations may include code or instructions included in a program.

For example, the hardware-implemented data processing device may include a microprocessor, a CPU, a processor core, a multi-core processor, a multiprocessor, an ASIC, and a FPGA.

The data processing apparatus 10 may enhance an overall operation performance by reducing a bandwidth occupancy of the host core (for example, a second processor) by managing a transaction of data between memories or between memory and the host core using the DMA 130.

The processor 171 may be implemented in the memory 170 or in a near memory. The processor 171 may perform an operation in the memory 170 based on the memory command. The processor 171 may perform the operation via a PIM device program.

The data processing apparatus 10 may enhance a parallel availability of the host core 110 using the DMA 130 to render the host core 110 to use a full memory bandwidth in performing a PIM operation.

The data processing apparatus 10 may reduce a current consumption caused by an occupation of the host core 110 by controlling the memory 170 and the processor 171 using the DMA 130.

The data processing apparatus 10 may not use a memory fence by rendering the DMA 130 to manage a transaction of data generated from the memory 170. Through this, the data processing apparatus 10 may prevent generating a performance overhead for controlling the host core 110 operating in an out-of-order form to operate in an in-order form.

Figure 2:
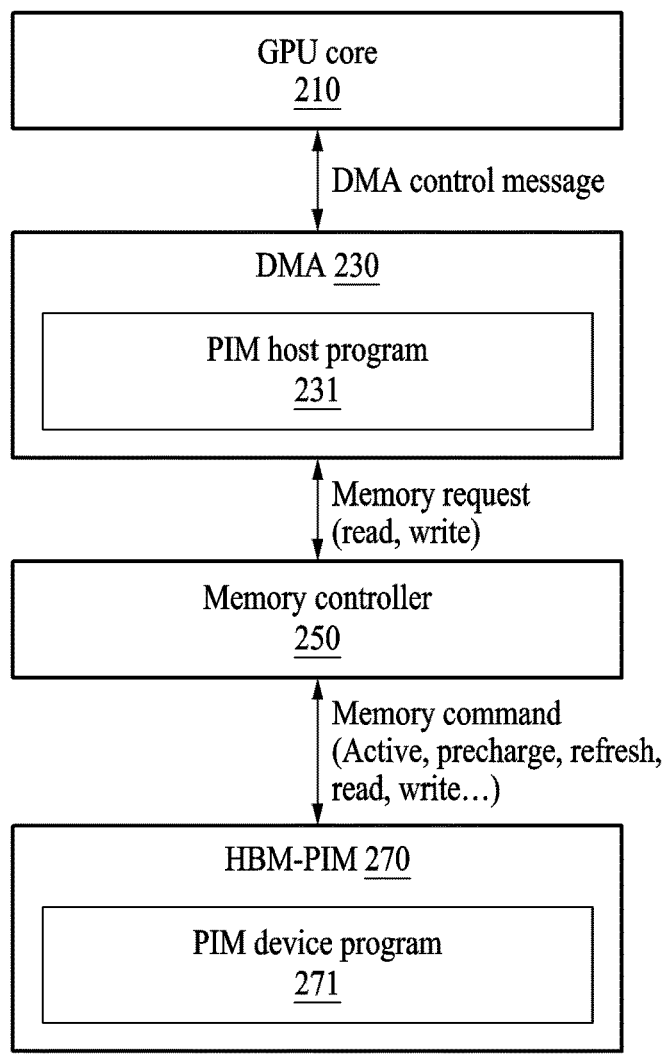
FIGS. 2 through 5 illustrate examples of implementing the data processing apparatus according to FIG. 1.

FIG. 2 illustrates an example of the data processing apparatus according to FIG. 1.

Referring to FIG. 2, the data processing apparatus (for example, the data processing apparatus 10 of FIG. 1) may include a GPU core 210, a DMA 230 (for example, the DMA 130 of FIG. 1), a memory controller 250 (for example, the memory controller 150 of FIG. 1), and a HBM-PIM 270.

The GPU core 210 may operate the same as the host core 110 of FIG. 1. The GPU core 210 may generate a control message to control the DMA 230. The GPU core 210 may transmit or receive data to and from the HBM-PIM 270 through the DMA 230.

The DMA 230 may generate a memory request from the DMA control message using a PIM host program 231.

The DMA 230 may receive a command related to data from the HBM-PIM 270. The DMA 230 may process a transaction of data occurred in the HBM-PIM 270 based on a layout of the data and the command. The DMA 230 may control a transaction of data between the GPU core 210 and the HBM-PIM 270.

In an example, instead of the GPU core 210, the DMA 230 may manage a transaction of data generated in the HBM-PIM 270. The DMA 230 may have information about a layout of data and a command (for example, a PIM command). If an operation is to be performed in the HBM-PIM 270, the GPU core 210 may transmit a control message to the DMA 230. The DMA 230 may allow to use a full bandwidth by supervising the transaction of data generated in the HBM-PIM 270 based on the control message. That is, in an example, instead of the GPU core 210, the DMA 230 may stably secure the full bandwidth by supervising the transaction of data generated in the HBM-PIM 270.

The memory controller 250 may generate a memory command in response to the memory request. The memory command may include an active command, a precharge command, a refresh command, a read command, and a write command.

The HBM-PIM 270 may store data. The HBM-PIM 270 may store data used in the GPU core 210 and a processor (for example, the processor 171 of FIG. 1) in the HBM-PIM 270. Operation results obtained by the processor in the HBM-PIM 270 and the GPU core 210 may be stored.

The HBM-PIM 270 may perform an operation via a PIM device program 271. The processor in the HBM-PIM 270 may perform the operation based on the data. The HBM-PIM 270 may output a result of the operation to the GPU core 210. The HBM-PIM 270 may additionally perform another operation by receiving the data.

Figure 3:
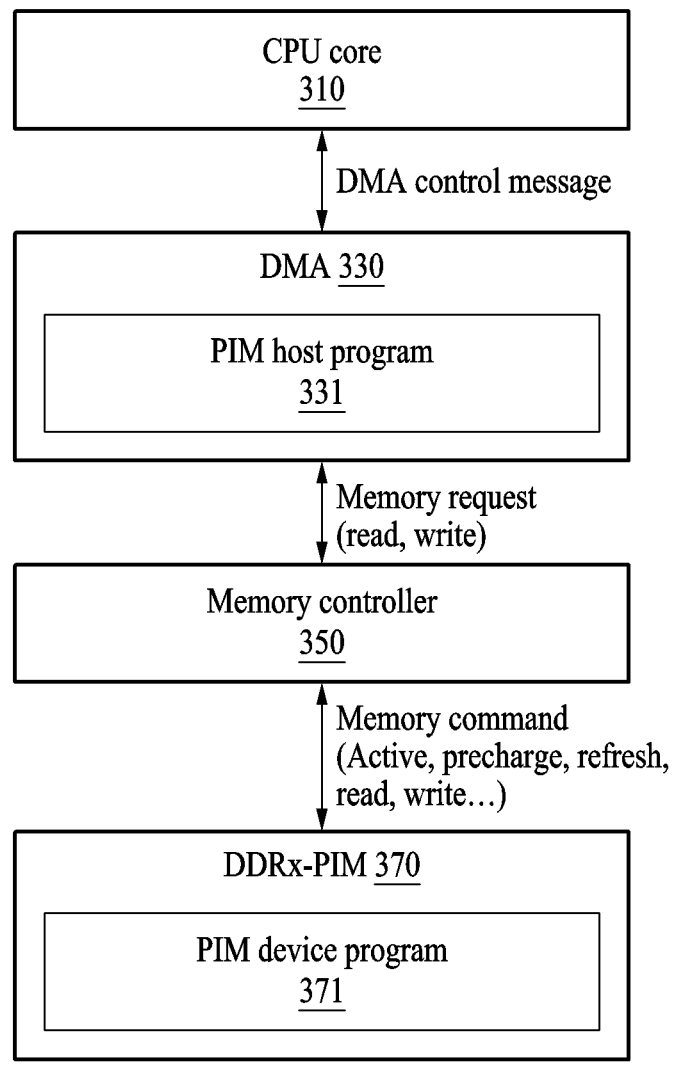

FIG. 3 illustrate an example of the data processing apparatus according to FIG. 1.

Referring to FIG. 3, the data processing apparatus (for example, the data processing apparatus 10 of FIG. 1) may include a CPU core 310, a DMA 330 (for example, the DMA 130 of FIG. 1), a memory controller 350 (for example, the memory controller 150 of FIG. 1), and a data direction register PIM, DDRx-PIM 370.

The CPU core 310 may operate the same as the host core 110 of FIG. 1. The CPU core 310 may generate a control message to control the DMA 330. The CPU core 310 may transmit or receive data to and from the DDRx-PIM 370 through the DMA 330.

The DMA 330 may generate a memory request from the DMA control message by using a PIM host program 331.

The DMA 330 may receive a command related to data from the DDRx-PIM 370. The DMA 330 may process a transaction of data occurred in the DDRx-PIM 370 based on a layout of the data and the command. The DMA 330 may control a transaction of data between the CPU core 310 and the DDRx-PIM 370.

In an example, instead of the CPU core 310, the DMA 330 may manage a transaction of data generated in the DDRx-PIM 370. The DMA 330 may have information about a layout of data and a command (for example, a PIM command). If an operation is to be performed in the DDRx-PIM 370, the CPU core 310 may transmit a control message to the DMA 330. The DMA 330 may allow to use a full bandwidth by supervising the transaction of data generated in the DDRx-PIM 370 based on the control message. That is, instead of the CPU core 310, the DMA 330 may stably secure the full bandwidth by supervising the transaction of data generated in the DDRx-PIM 370.

The memory controller 350 may generate a memory command in response to the memory request. The memory command may include an active command, a precharge command, a refresh command, a read command, and a write command.

The DDRx-PIM 370 may store data. The DDRx-PIM 370 may store data used in the CPU core 310 and a processor (for example, the processor 171 of FIG. 1) in the DDRx-PIM 370. Operation results obtained by the processor in the DDRx-PIM 370 and the CPU core 310 may be stored.

The DDRx-PIM 370 may perform an operation via the PIM device program 371. The processor in the DDRx-PIM 370 may perform the operation based on the data. The DDRx-PIM 370 may output a result of the operation to the CPU core 310. The DDRx-PIM 370 may additionally perform another operation by receiving data.

Figure 4:
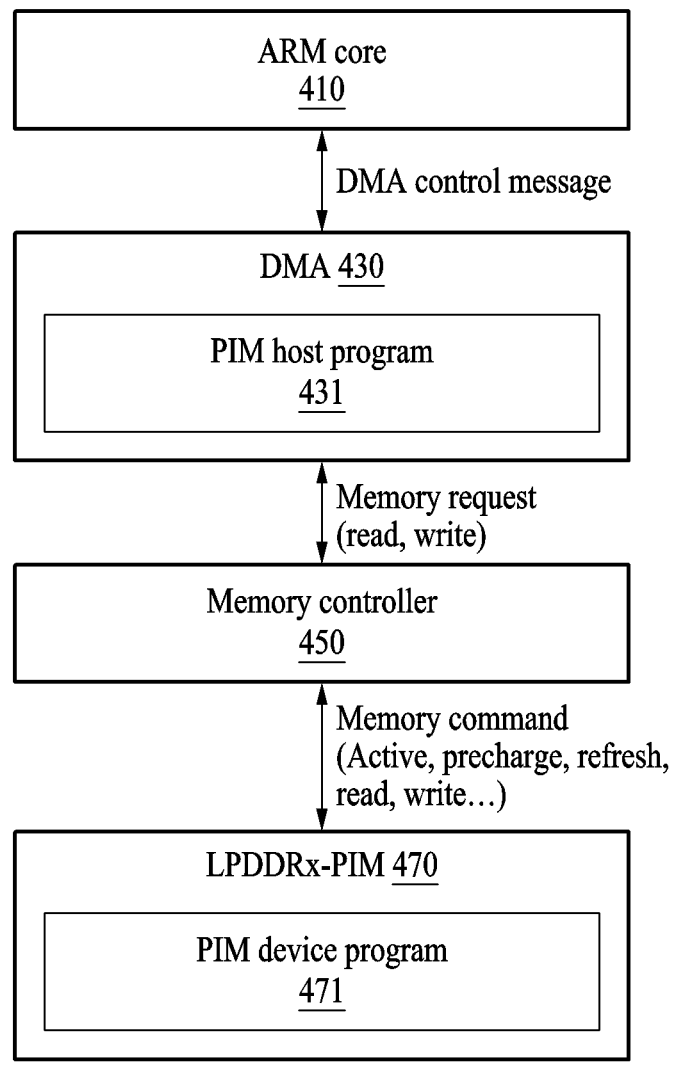

FIG. 4 illustrates an example of the data processing apparatus according to FIG. 1.

Referring to FIG. 4, the data processing apparatus (for example, the data processing apparatus 10 of FIG. 1) may include an ARM core 410, a DMA 430 (for example, the DMA 130 of FIG. 1), a memory controller 450 (for example, the memory controller 150 of FIG. 1), and a low-power double data rate PIM, LPDDRx-PIM 470.

The ARM core 410 may operate the same as the host core 110 of FIG. 1. The ARM core 410 may generate a control message to control the DMA 430. The ARM core 410 may transmit or receive data to and from the LPDDRx-PIM 470 through the DMA 430.

The DMA 430 may generate a memory request from the DMA control message by using a PIM host program 431.

The DMA 430 may receive a command related to data from the LPDDRx-PIM 470. The DMA 430 may process a transaction of data occurred in the LPDDRx-PIM 470 based on a layout of the data and the command. The DMA 430 may control a transaction of data between the ARM core 410 and the LPDDRx-PIM 470.

In an example instead of the ARM core 410, the DMA 430 may manage a transaction of data generated in the LPDDRx-PIM 470. The DMA 430 may have information about a layout of data and a command (for example, a PIM command). If an operation is to be performed in the LPDDRx-PIM 470, the ARM core 410 may transmit a control message to the DMA 430. The DMA 430 may allow to use a full bandwidth by supervising the transaction of data generated in the LPDDRx-PIM 470 based on the control message. That is, instead of the ARM core 410, the DMA 430 may stably secure the full bandwidth by supervising the transaction of data generated in the LPDDRx-PIM 470.

The memory controller 450 may generate a memory command in response to the memory request. The memory command may include an active command, a precharge command, a refresh command, a read command, and a write command.

The LPDDRx-PIM 470 may store data. The LPDDRx-PIM 470 may store data used in the ARM core 410 and a processor (for example, the processor 171 of FIG. 1) in the LPDDRx-PIM 470. Operation results obtained by the processor in the LPDDRx-PIM 470 and the ARM core 410 may be stored.

The LPDDRx-PIM 470 may perform an operation via a PIM device program 471. The processor in the LPDDRx-PIM 470 may perform the operation based on the data. The LPDDRx-PIM 470 may output a result of the operation to the ARM core 410. The LPDDRx-PIM 470 may additionally perform another operation by receiving data.

Figure 5:
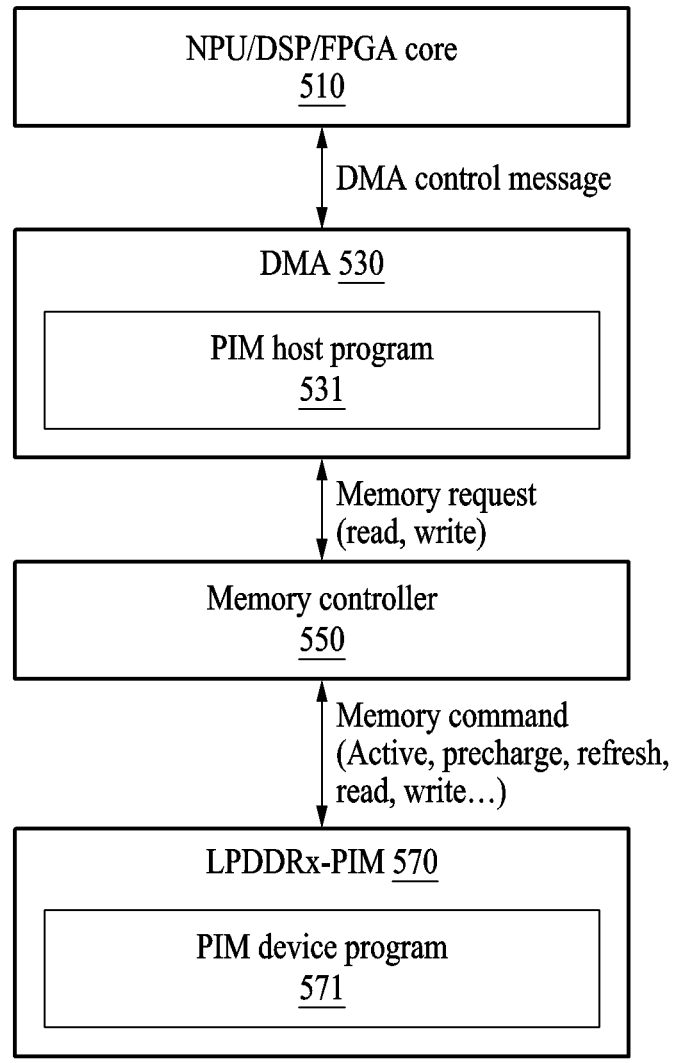

FIG. 5 illustrates an example of the data processing apparatus according to FIG. 1.

Referring to FIG. 5, the data processing apparatus (for example, the data processing apparatus 10 of FIG. 1) may include a NPU/DSP/FPGA core 510, a DMA 530 (for example, the DMA 130 of FIG. 1), a memory controller 550 (for example, the memory controller 150 of FIG. 1) and a LPDDRx-PIM 570.

The NPU/DSP/FPGA core 510 may operate the same as the host core 110 of FIG. 1. The NPU/DSP/FPGA core 510 may generate a control message to control the DMA 530. The NPU/DSP/FPGA core 510 may transmit or receive data to and from the LPDDRx-PIM 570 through the DMA 530.

The DMA 530 may generate a memory request from the DMA control message using a PIM host program 531.

The DMA 530 may receive a command related to data from the LPDDRx-PIM 570. The DMA 530 may process a transaction of data occurred in the LPDDRx-PIM 570 based on a layout of the data and the command. The DMA 530 may control a transaction of data between the NPU/DSP/FPGA core 510 and the LPDDRx-PIM 570.

In an example, instead of the NPU/DSP/FPGA core 510, the DMA 530 may manage a transaction of data generated in the LPDDRx-PIM 570. The DMA 530 may have information about a layout of data and a command (for example, a PIM command). If an operation is to be performed in the LPDDRx-PIM 570, the NPU/DSP/FPGA core 510 may transmit a control message to the DMA 530. The DMA 530 may allow to use a full bandwidth by supervising the transaction of data generated in the LPDDRx-PIM 570 based on the control message. That is, in an example, instead of the NPU/DSP/FPGA core 510, the DMA 530 may stably secure the full bandwidth by supervising the transaction of data generated in the LPDDRx-PIM 570.

The memory controller 550 may generate a memory command in response to the memory request. The memory command may include an active command, a precharge command, a refresh command, a read command, and a write command.

The LPDDRx-PIM 570 may store data. The LPDDRx-PIM 570 may store data used in the NPU/DSP/FPGA core 510 and a processor (for example, the processor 171 of FIG. 1) in the LPDDRx-PIM 570. Operation results obtained by the processor in the LPDDRx-PIM 570 and the NPU/DSP/FPGA core 510 may be stored.

The LPDDRx-PIM 570 may perform an operation via a PIM device program 571. The processor in the LPDDRx-PIM 570 may perform the operation based on the data. The LPDDRx-PIM 570 may output a result of the operation to the NPU/DSP/FPGA core 510. The LPDDRx-PIM 570 may additionally perform another operation by receiving data.

Figure 6:
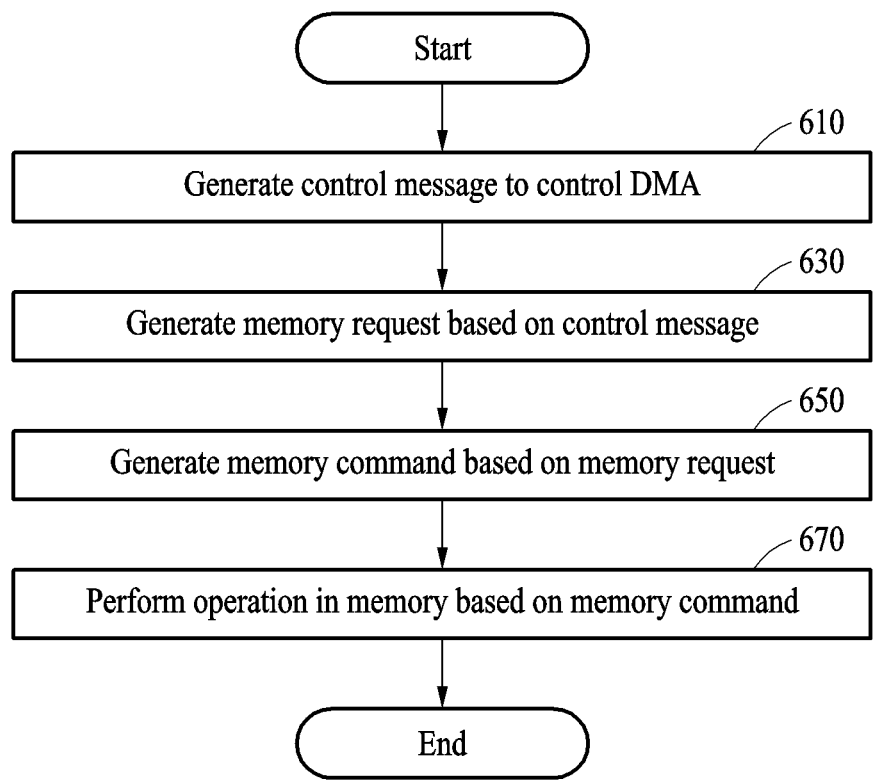
FIG. 6 illustrates an example of an operation of the data processing apparatus of FIG. 1.

FIG. 6 illustrates an example of an operation of the data processing apparatus of FIG. 1. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, in operation 610, a host core (for example, the host core 110 of FIG. 1) may generate a control message to control a DMA (for example, the DMA 130 of FIG. 1). The host core 110 may include a CPU, a GPU, a NPU, a DSP, an ARM or a FPGA.

In operation 630, the DMA (for example, the DMA 130 of FIG. 1) may generate a memory request based on the control message. The DMA 130 may generate the memory request via a PIM host program. The DMA 130 may generate a read request or a write request via the PIM host program. The DMA 130 may generate the memory request in an in-order form via the PIM host program.

In operation 650, a memory controller (for example, the memory controller 150 of FIG. 1) may generate a memory command based on the memory request. The memory controller 150 may convert the memory request into the memory command including an active command, a pre-charge command, a refresh command, a read command, and a write command.

A memory (for example, the memory 170 of FIG. 1) may include a DRA, such as, for example, a DDR SDRAM, a LPDDR and a HBM. The memory 170 may include a processor (for example, the processor 171 of FIG. 1).

In operation 670, the processor 171 may perform an operation in the memory 170 based on the memory command. The processor 171 may perform the operation via a PIM device program.

The battery charging apparatus 120, battery charging apparatus 1912, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The software may include a computer program, a piece of code, an instruction, or some combination thereof, to independently or uniformly instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the data processing method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A data processing apparatus comprising:
   a host core configured to generate a control message to control a direct memory access (DMA);
   the DMA configured to generate a memory request based on the control message;
   a memory controller configured to generate a memory command based on the memory request; and
   a processor configured to perform an operation in a memory based on the memory command,
   wherein the DMA comprises a processing in memory (PIM) host program.

2. The data processing apparatus of claim 1, wherein the host core comprises a central processing unit (CPU), a graphics processing unit (GPU), a neural processing unit (NPU), a digital signal processor (DSP), an advanced reduced instruction set computer (RISC) machine (ARM), or a field programmable gate array (FPGA).

3. The data processing apparatus of claim 1, wherein the DMA is further configured to generate the memory request via a processing in memory (PIM) host program.

4. The data processing apparatus of claim 3, wherein the DMA is further configured to generate a read request or a write request via the PIM host program.

5. The data processing apparatus of claim 3, wherein the DMA is further configured to generate the memory request in an in-order form via the PIM host program.

6. The data processing apparatus of claim 1, wherein the memory controller is further configured to convert the memory request into the memory command comprising any one or any combination of an active command, a precharge command, a refresh command, a read command, and a write command.

7. The data processing apparatus of claim 1, wherein the memory comprises a dynamic random access memory (DRAM).

8. The data processing apparatus of claim 7, wherein the DRAM comprises one or any combination of a double data rate synchronous dynamic random access memory (DDR SDRAM), a low power DDR (LPDDR), and a high bandwidth memory (HBM).

9. The data processing apparatus of claim 1, wherein the processor is further configured to perform the operation via a PIM device program.

10. A data processing method comprising:
    generating, by a host core, a control message to control a direct memory access (DMA);
    generating, by the DMA, a memory request based on the control message;
    generating, by a memory controller, a memory command based on the memory request; and
    performing, by a processor in a memory (PIM), an operation based on the memory command,
    wherein the DMA comprises a processing in memory (PIM) host program.

11. The data processing method of claim 10, wherein the generating of the control message comprises generating the control message using a central processing unit (CPU), a graphics processing unit (GPU), a neural processing unit (NPU), a digital signal processor (DSP), an advanced reduced instruction set computer (RISC) machine (ARM), or a field programmable gate array (FPGA).

12. The data processing method of claim 10, wherein the generating of the memory request comprises generating the memory request via a processing in memory (PIM) host program.

13. The data processing method of claim 12, wherein the generating of the memory request via the PIM host program comprises generating a read request or a write request via the PIM host program.

14. The data processing method of claim 12, wherein the generating of the memory request via the PIM host program comprises generating the memory request in an in-order form via the PIM host program.

15. The data processing method of claim 10, wherein the generating of the memory command comprises converting the memory request into the memory command comprising any one or any combination of an active command, a precharge command, a refresh command, a read command and a write command.

16. The data processing method of claim 10, wherein the memory comprises a dynamic random access memory (DRAM).

17. The data processing method of claim 16, wherein the DRAM comprises any one or any combination of a double data rate synchronous dynamic random access memory (DDR SDRAM), a low power DDR (LPDDR), and a high bandwidth memory (HBM).

18. The data processing method of claim 10, wherein the performing of the operation comprises performing the operation via a PIM device program.

19. A non-transitory computer-readable storage medium storing instructions that, when executed by a processor, cause the processor to perform the data processing method of claim 10.

* * * * *